United States Patent [19]

Brown et al.

[11] 4,246,360

[45] Jan. 20, 1981

[54] FIRE RETARDANT, NON-DRIPPING FLEXIBLE POLYURETHANE FOAM

[75] Inventors: Jasper H. Brown, Woodriver; Albert W. Morgan, Collinsville, both of Ill.

[73] Assignee: Monsanto Company, St. Louis, Mo.

[21] Appl. No.: 818,047

[22] Filed: Jul. 22, 1977

[51] Int. Cl.$^3$ .................... C08K 5/02; C08K 5/52; C08K 5/53; C08L 75/12

[52] U.S. Cl. .................... 521/102; 521/107; 521/108; 521/132; 521/906

[58] Field of Search ............ 260/2.5 AM; 521/102, 521/163, 107, 125

[56] References Cited

U.S. PATENT DOCUMENTS

| | | | |
|---|---|---|---|
| 2,798,054 | 7/1957 | Simon et al. | 521/102 |
| 2,911,379 | 11/1959 | Parker et al. | 521/125 |
| 3,075,930 | 1/1963 | Stewart et al. | 521/102 |
| 3,108,975 | 10/1963 | Lambert et al. | 521/125 |
| 3,516,950 | 6/1970 | Haggis | 521/125 |
| 3,582,500 | 6/1971 | Carriere et al. | 521/125 |
| 3,629,162 | 12/1971 | Richardson et al. | 260/2.5 AM |
| 3,681,273 | 8/1972 | Kelly | 521/125 |
| 3,803,064 | 4/1974 | Fishbein et al. | 521/107 |
| 3,817,881 | 6/1974 | Turley | 521/107 |
| 3,916,060 | 10/1975 | Fish et al. | 521/107 |
| 3,951,822 | 4/1976 | Brown et al. | 521/107 |
| 3,968,187 | 7/1976 | Morgan et al. | 260/929 |
| 4,032,483 | 6/1977 | Hartman | 260/2.5 AM |
| 4,185,146 | 1/1980 | Burke | 521/102 |

OTHER PUBLICATIONS

Noller, Chemistry of Organic Compounds, 2nd Edition, 1957, pp. 293-295.
Monsanto Bulletin, Phosgard C-22-R.

*Primary Examiner*—Lorenzo B. Hayes
*Assistant Examiner*—R. A. White
*Attorney, Agent, or Firm*—George R. Beck; Robert E. Wexler

[57] ABSTRACT

A flexible polyurethane foam is provided which is fire retardant and non-dripping upon exposure to flame. The flexible polyurethane foam is prepared by the reaction of a polyol, an isocyanate and a protein.

20 Claims, No Drawings

FIRE RETARDANT, NON-DRIPPING FLEXIBLE POLYURETHANE FOAM

BACKGROUND OF THE INVENTION

The field of this invention relates to flexible polyurethane foams and, particularly, to flexible polyurethane foams which have a reduced tendency to drip when exposed to flame.

The preparation of flexible polyurethane foams from polyols and isocyanates is well known. Polyurethane foams burn easily and, accordingly, the incorporation therein of various flame retardant materials is conventional. The mere incorporation of flame retardant additives does not, however, reduce the unfortunate tendency of polyurethane foams to melt in contact with flame and to drip melting fragments.

Attempts have been made to overcome the melting or dripping tendency of polyurethane foams upon exposure to flames, but such attempts have not succeeded to an appreciable extent. The problem apparently lies in the fact that most attempts to prevent polyurethane foam from dripping upon exposure to flame involve the addition of foam precursors or additives to the foam which do not provide a homogeneous coherent foam. Accordingly, there is a need for providing a polyurethane foam which has a reduced tendency to drip upon exposure to flame.

A distinction must be made between the problems involved in flexible polyurethane foams and rigid polyurethane foams upon exposure to flame. Rigid polyurethane foams do not drip upon exposure to flame. The very structure of a rigid polyurethane foam enables the manufacturer to incorporate therein higher amounts of fillers and flame retardants than can be incorporated in a flexible polyurethane foam. Were a manufacturer of flexible polyurethane foam to incorporate all of the various filler and additives which may be added to a rigid foam, the flexible flame would lose its flexibility. The manufacturer of rigid foam does not have to consider loss in flexibility upon incorporation of high amounts of additives. Prior attempts to prevent flexible polyurethane foam from dripping resulted in the lowering of the physical properties because of addition of high amounts of fillers, and the foam thus produced was of a high density which had reduced flexibility and usefulness.

SUMMARY OF THE INVENTION

In accordance with the present invention, it has been found that a flexible polyurethane foam can be prepared which has a reduced tendency to drip upon exposure to flame. The invention contemplates the addition of protein to the polyurethane foam during its manufacture. Thus, a protein is added to the polyol and isocyanate reactants and the protein thereby reacts with and becomes an integral chemical part of the primary polyurethane components and acts to partially cross-link the polyurethane foam so as to prevent its collapse and dripping when exposed to flame.

PRIOR ART

The following prior art is believed relevant to the present invention;

U.S. Pat. No. 3,658,731 discloses the preparation of a type of rigid polyurethane foam which is prepared by the reaction of an isocyanate with whey powder and dimethyl sulfoxide. The whey powder contains from 8 to 14 percent protein.

U.S. Pat. No. 3,660,321 discloses a polyurethane foam which has been flame retarded by the addition of microcapsules filled with flame retardant material. The microcapsules may be made from gelatin.

SPECIFIC EMBODIMENTS OF THE INVENTION

In accordance with the present invention, it has been found that if protein is added during the manfacture of a polyurethane foam and if the protein and the foam components, e.g., the polyol and isocyanate, are added in a critical sequence, the statistical chances of a high degree of crosslinking is reduced and a polyurethane foam having good density and flexibility but reduced tendency to drip is afforded. As stated above, the problem of reducing the statistical tendency of cross-linking of the protein by isocyanate is of no consequence in preparing rigid polyurethane foams since, by their very nature, rigid foams are preferably completely cross-linked.

Isocyanates which may be used in acordance with the present invention include any of the organic polyisocyanates conventionally employed for reaction with polyols, polyetherpolyols or polyesters in the manufacture of polyurethanes. Exemplary polyisocyanates include 2,4-tolylene diisocyanate, 2,6-tolylene diisocyanate, benzene diisocyanate, m-xylylene diisocyanate, 1,4-phenylene diisocyanate, 1,3-phenylene diisocyanate, 4,4'-diphenyl diisocyanate, 4,4'-diphenyldimethylmethane diisocyanate, hexamethylene diisocyanate, tolidine diisocyanate, dianisidine diisocyanate, 1,5-naphthalene diisocyanate, 1,4-cyclohexane diisocyanate and similar compounds.

Polyols which are used in accordance with the present invention include any of the organic polyols, polyetherpolyols and polyesters conventionally used in the preparation of polyurethanes. Exemplary compounds include ethylene glycol, propane-1,3-diol, butane-1,4-diol, hexane-1,6-diol, 1,3- or 1,4-xylylene glycol, 1,4-bisoxymethyl cyclohexane, poly(oxyethylene)glycol, poly(oxypropylene)glycol, poly(oxybutylene) glycol, poly(oxyalkylene)adducts of glycerin, trimethylolpropane, 1,2,6-hexanetriol, pentaerythritol, sorbitol and polyesters from glycols and aliphatic acids.

The preparation of a rigid polyurethane foam which has reduced flammability is quite different than preparing a flexible polyurethane foam which has a reduced tendency to burn and drip. Basically, the alcohols used to prepare rigid and flexible foams are different. In rigid polyurethane foams polyfunctional alcohols, e.g., polyglycols, are utilized in order to form many cross-linking sites with the isocyanate reactant and thus produce the rigid foam structure. In flexible polyurethane foams difunctional polyols are used so as to reduce the number of sites for cross-linking by the isocyanate and thus allow the foam to be flexible.

Proteins which are added in accordance with this invention include both simple and conjugated proteins. Simple proteins are represented by albumins such as ovalbumin; globulins; glutelins such as glutenin, vegetable casein, flour gluten and casein, prolamins such as gliadin and zein; albuminoids such as bone hide and tendon collagens, e.g., bone glue, elastin and animal and vegetable gelatin; and protamins. Conjugated proteins which are included within the scope of this invention include the chemoproteins, mucoproteins, glycoproteins, lipoproteins, phosphoproteins and nucleoproteins. Proteins preferably used in the practice of the present invention are the glutelins, e.g., casein and the bone hide collagens, e.g., bone glue and gelatin.

In preparing the protein-containing polyurethane foams contemplated by the present invention, the proportions of polyol and isocyanate which are reacted correspond to our index of from about 80 to about 120, preferably from about 90 to about 115. An index is a measure of stoichiometric balance of combining substances. As applied to polyurethane foam, it is the relationship between the equivalent weights of isocyanate on one side and water and polyol on the other side. An index of 100 indicates that the equivalent weights are balanced. An index of 80 indicates a 20 percent shortage of isocyanate and an index of 120 indicates a 20 percent surplus of isocyanate. The concentration of protein, based on the weight of the polyol, may be from about 10 to about 100 percent, preferably from about 20 to about 50 percent.

It has been found that the order of addition of the polyurethane foam reactants is critical in order to form a foam which has a reduced tendency to drip but which is still flexible and of good density and having good foaming characteristics. Thus, the order of addition of ingredients to obtain optimum non-drip characteristics is to (1) form a mixture of the polyol, flame retardant, catalyst, surfactant and blowing agent, (2) add the protein to such mixture and then (3) add a mixture of isocyanate and polymerization catalyst.

Flexible polyurethane foam is conventionally prepared by mixing polyol, amine, silicone and water for 30 seconds, adding the flame retardant and stirring for 30 seconds, adding the catalyst and stirring for 6 seconds and adding the isocyanate and stirring until foaming begins.

In the formulations described, finely divided pigments and inorganic fillers may be incorporated. Examples of such materials are convention pigments such as $TiO_2$ and fillers such as magnesium carbonate, Dawsonite, alumina and hydrated alumina.

The addition of such materials should be no greater than about 40 PHR (parts per hundred parts of resin) to avoid decreasing the flexibility of the polyurethane foam.

Buffering agents may be added to the foam formulations for the purpose of maintaining the proper pH to allow the foam reaction to occur at an even rate and thereby achieve consistent cell size. Addition of buffers is especially important when acidic flame retardants, such as chlorinated paraffins or phosphonates, are added.

Typical buffering agents include lead stearate, sodium acetate, potassium hydrogen phthalate, potassium dihydrogen phosphate, disodium hydrogen phosphate, borax and similar compounds which are conventionally used to prepare solutions having a stable pH.

The buffering agents are used in an amount of from about 0.1 to about 10 percent by weight based on the polymer. A preferred concentration of buffer is from about 0.5 to about 5 percent by weight. The amount of buffer used will vary, of course, depending on the acidity of the system and the pH desired. Generally, an amount of buffer is used which will result in a pH of from about 5.5 to about 8.5, preferably from about 6.5 to about 7.5.

Flame retardant agents which are utilized in the present invention are those conventionally used for such purposes. They include phosphorus compounds and halogenated phosphorus compounds such as trialkyl phosphates, e.g. tributyl phosphate, tris-2,3-dichloropropyl phosphate, tris-2,3-dibromopropyl phosphate, trioctyl phosphate, triundecyl phosphate; dialkylaryl phosphates, e.g., dibutyl phenyl phosphate, alkyldiaryl phosphates, e.g., isodecyl diphenyl phosphates and octyl diphenyl phosphate; triaryl phosphates, e.g., tricresyl phosphate, triphenyl phosphate, cumylphenyl diphenyl phosphate. Other phosphorus compounds used include diethylene glycol bis(di-2-chloroethyl)-phosphate, 2,2-bis(chloromethyl)trimethylene bis[bis(2-chloroethyl)phosphate] and polyphosphonates of the formula

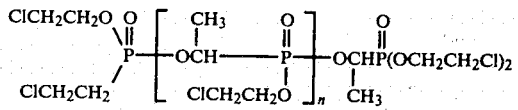

wherein n has an average value of 1 to 2.

In the following Examples, certain flammability tests are conducted and conclusions are drawn therefrom. The flammability tests used are the conventional horizontal and vertical burning tests, the former being identified as ASTM 1692-74 and the latter being identified as UL94.

The flammability tests are described as follows: ASTM 1692 is the most widely used burning test for cellular plastics. In such test, a specimen (152.4 mm. × 50.8 mm. × 25.4 mm) is supported on a horizontal hard-cloth support with the 25.4 mm. dimension vertical.

One end is contacted for 60 seconds with a 38.1 mm. high blue flame from a 9.5 mm. diameter barrel Bunsen burner fitted with 47.6 mm. wide wingtop.

If the specimen instantly goes out, it is self-extinguishing. If the specimen burns and subsequently goes out, it is characterized as self-extinguishing/burn rate given as mm. and seconds burned. If the specimen completely burns, its burn rate in mm./minute is given.

The "UL-94" test is utilized to determine the resistance of a plastic material to continued combustion and to ignition. In this test, a standard specimen is supported, from the upper 6.4 mm. of the specimen with the longitudinal axis vertical, by a clamp on a ring stand so that the lower end of the specimen is 9.5 mm. above the top of the burner tube and 305 mm. above a horizontal layer of dry absorbent surgical cotton. The burner is placed remote from the specimen, ignited and adjusted to produce a blue flame 19 mm. high. The test flame is placed centrally under the lower end of the test specimen and allowed to remain for 10 seconds. The test flame is then withdrawn and the duration of the flaming of the specimen noted. When the flaming of the specimen ceases, the test flame is immediately placed again under the specimen. After 10 seconds, the test flame is again withdrawn and the duration of flaming and glowing noted.

In this procedure, V-0 is the highest rating obtainable. It indicates an average burn time of less than 50 seconds (2 ignitions for each of 5 specimens), no one burn of greater than 10 seconds, no dripping flame, no afterglow beyond 30 seconds after the second removal of the flame and no ignition of the layer of cotton. A rating of V-1 allows up to 250 seconds average burn time and a V-2 rating indicates the sample drips and flames.

EXAMPLE I

This example illustrates the preparation and vertical burn testing of a flexible polyurethane foam containing a flame retardant but no protein.

A flexible polyurethane foam was prepared from the following formulation:

| Ingredients | Parts by Weight |
|---|---|
| PLURACOL GP 3030[1] | 50.00 |
| Water | 2.00 |
| DABCO 33 LV[2] Accelerator | 0.33 |
| Surfactant L520[3] | 0.50 |
| PHOSGARD 2XC20[4] | 10.00 |
| Stannous octoate catalyst | 3 drops |
| Tolylene diisocyanate | 27.00 |

[1]Polyether polyol (Wyandotte Chemical Company)
[2]Triethylamine diamine/dipropylene glycol (Houdry Process Company)
[3]Block siloxane/polyoxyalkylene copolymer (Union Carbide)
[4][2,2-bis(chloromethyl)]trimethylene bis[bis(2-chloroethyl)phosphate] (Monsanto) which has the structural formula

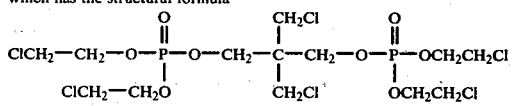

Vertical burn tests classified the sample as V-2.

EXAMPLE II

This Example illustrates the preparation and vertical burn testing of a polyurethane foam having the formulation of Example I but with the addition of protein.

A polyurethane foam was prepared as in Example I, but 25 phr of the polyether polyol was replaced by 25 phr of Knox gelatin.

Vertical burn tests classified the sample as V-0 (i.e., combustion lasted less than 2 seconds after application of test flame with no dripping of flaming particles that ignite cotton pad located 305 mm. below test specimen).

EXAMPLE III

This Example illustrates the preparation and horizontal and vertical burn testing of a polyurethane foam containing protein and a filler.

A flexible polyurethane foam was prepared from the following formulation:

| Ingredients | Parts by Weight |
|---|---|
| PLURACOL GP 3030 | 70.00 |
| Water | 4.00 |
| DABCO 33LV | 0.65 |
| Surfactant Y6634* | 1.00 |
| PHOSGARD 2XC20 | 20.00 |
| Knox Gelatin | 40.00 |
| Al$_2$O$_3$ | 30.00 |
| Stannous Octoate | 6 drops |
| Tolylene diisocyanate | 54.00 |

*Siloxane/polyoxyalkylene block copolymer (Union Carbide)

The foam had a density of 0.37 kg/cm$^2$, was self-extinguishing in the horizontal burn test and was classified V-0 in the vertical burn test. There was no dripping of the foam on exposure to flame.

EXAMPLE IV

This Example illustrates the preparation and vertical burn testing of polyurethane foams, one of which contains a sodium acetate buffering agent.

| Ingredients | Sample #1 | Sample #2 |
|---|---|---|
| PLURACOL GP 3030 | 50 | 50 |
| Water | 2 | 2 |
| DABCO 33LV | 0.40 | 0.40 |
| L520 | 0.5 | 0.5 |
| Uniclor 70[1] | 4 | 4 |
| PHOSGARD C22R[2] | 4 | 4 |
| Sodium acetate | — | 2 |
| Gelatin | 15 | 15 |
| Stannous octoate | 0.10 | 0.10 |
| Tolylene diisocyanate | 27 | 27 |

[1]Chlorinated paraffin (Neville Chemical Company)
[2]Polyphosphonate of the formula set forth at page 8, line 7 (Monsanto)

In the absence of a buffering agent, Sample #1 collapsed and no foam was obtained due to the acidity of the formulation caused by use of chlorinated paraffin and PHOSGARD C22R. Sample #2, containing a buffering agent, produced a good foam and was classified V-0 in the vertical burn test.

EXAMPLE V

This example illustrates the criticality of addition of polyurethane foam reactants. Two samples were prepared from the following formulation:

| Ingredients | Parts by Weight | |
|---|---|---|
| | Sample #1 | Sample #2 |
| PLURACOL GP 3030 | 25 | 25 |
| Water | 2 | 2 |
| DABCO 33LV | 0.4 | 0.4 |
| L520 | 0.5 | 0.5 |
| PHOSGARD 2XC20 | 10 | 10 |
| Gelatin | 25 | 25 |
| Stannous Octoate | .08 | .08 |
| Tolylene diisocyanate | 27 | 27 |

Sample #1 was mixed in the conventional manner described immediately preceding Example I. There was obtained a boardy foam of low quality that was Classified V-1 in the vertical burn test.

Sample #2 was mixed, as were the formulations in Examples I through IV, as follows:

1. The stannous octoate catalyst and tolylene diisocyanate are premixed and set aside;
2. All ingredients are mixed, except the premix of Step 1 and the gelatin;
3. The gelatin is added to the mixture of Step 2;
4. The premix is added.

Sample #2 gave a good foam having a classification of V-0 in the vertical burn test.

What is claimed is:

1. A flexible foam comprising polyurethane, a protein present in an amount from about 10 to 100 percent based on the weight of polyol used in preparation of said foam, and a flame retarding amount of flame retardant selected from chlorinated paraffin, trialkyl phosphate, dialkyl aryl phosphate, alkyl diaryl phosphate, triaryl phosphate, diethylene glycol bis(di-2-chloroethyl)phosphate, 2,2-bis(chloromethyl)trimethylene bis[bis(2-chloroethyl)phosphate] and polyphosphonate of the formula

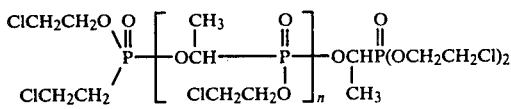

wherein n has an average value of 1 to 2.

2. Foam of claim 1 wherein said protein is a simple or conjugated protein.

3. Foam of claim 1 wherein said retardant is selected from chlorinated paraffin, alkyl diaryl phosphate, triaryl phosphate and 2,2-bis(chloromethyl)trimethylene bis[bis(2-chloroethyl)phosphate].

4. Foam of claim 1, said protein being present in an amount from about 20 to about 50 percent based on the weight of said polyol.

5. Foam of claim 1 wherein said protein is selected from albumin, globulin, glutelin, prolamin, albuminoid and protamin.

6. Foam of claim 1 wherein said protein is selected from casein, bone glue and gelatin.

7. Foam of claim 1 formed by reacting isocyanate with said polyol in a mixture comprising said protein, said flame retardant and a buffer which maintains pH of the mixture from about 5.5 to about 8.5.

8. Foam of claim 7 wherein said protein is a simple or conjugated protein.

9. Foam of claim 7 wherein said retardant is selected from chlorinated paraffin, alkyl diaryl phosphate, triaryl phosphate and 2,2-bis(chloromethyl)trimethylene bis[bis(2-chloroethyl)phosphate].

10. Foam of claim 7, said protein being present in said foam in an amount from about 20 to about 50 percent based on the weight of said polyol.

11. Foam of claim 7 wherein said protein is selected from albumin, globulin, glutein, prolamin, albuminoid and protamin.

12. Foam of claim 1 formed by adding difunctional isocyanate to a mixture of said polyol, said protein and said flame retardant.

13. Foam of claim 12 wherein said protein is a simple or conjugated protein.

14. Foam of claim 12 wherein said retardant is selected from chlorinated paraffin, alkyl diaryl phosphate, triaryl phosphate and 2,2-bis(chloromethyl)trimethylene bis[bis(2-chloroethyl)phosphate].

15. Foam of claim 12, said protein being present in said foam in an amount from about 20 to about 50 percent based on the weight of said polyol.

16. Foam of claim 12 wherein said protein is selected from casein, bone glue and gelatin.

17. Foam of claim 12, said mixture comprising a buffer which maintains pH of the mixture from about 5.5 to about 8.5.

18. Foam of claim 17 wherein said retardant is selected from chlorinated paraffin, alkyl diaryl phosphate, triaryl phosphate and 2,2-bis(chloromethyl)trimethylene bis[bis(2-chloroethyl)phosphate].

19. Foam of claim 17, said protein being present in said foam in an amount from about 20 to about 50 percent based on the weight of said polyol.

20. Foam of claim 17 wherein said protein is selected from albumin, globulin, glutelin, prolamin, albuminoid and protamin.

* * * * *